Feb. 3, 1970 W. K. FRENCH 3,493,934
TONE DECODER HAVING PLURAL REFERENCE TONES
Filed Jan. 6, 1967
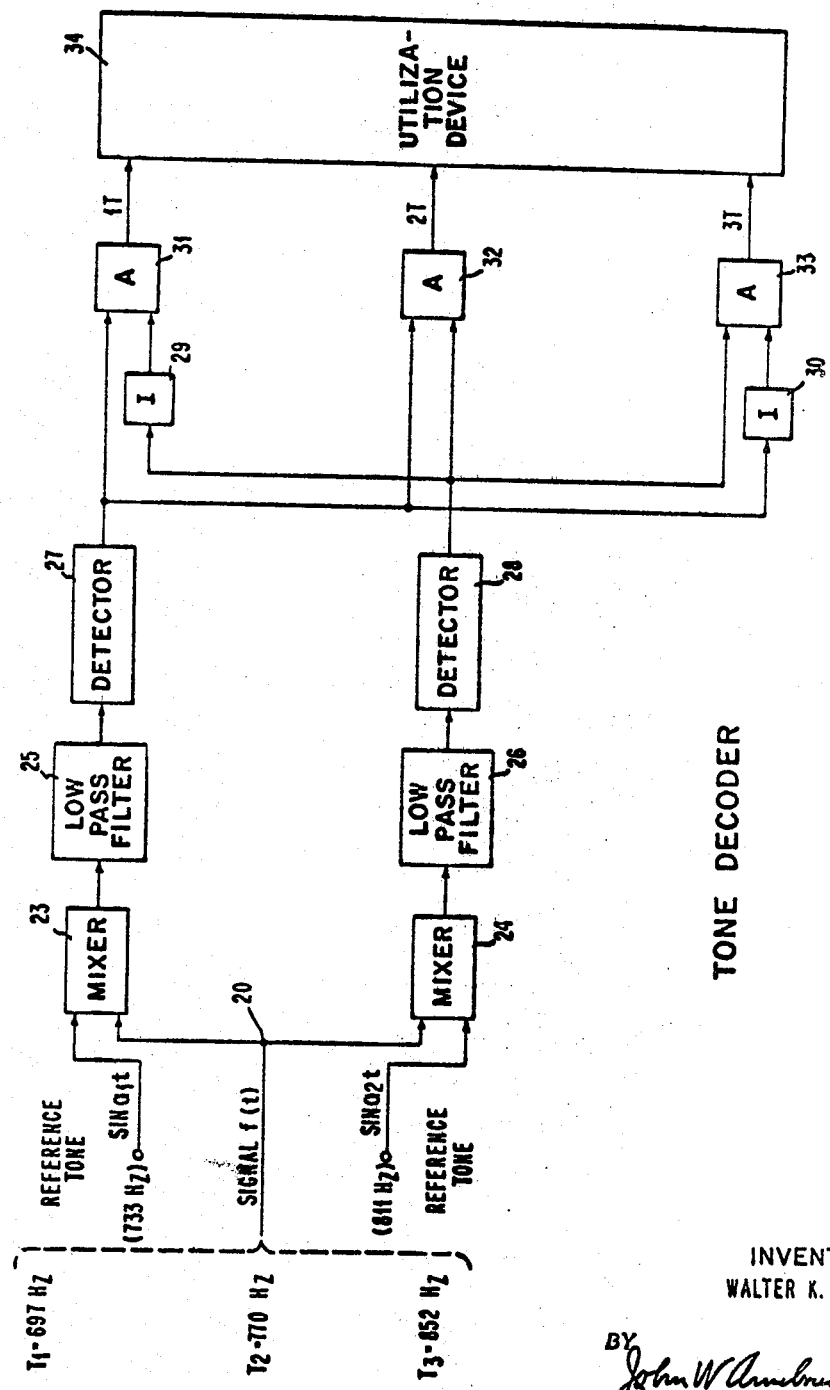
INVENTOR
WALTER K. FRENCH
BY
John W Armbruster
ATTORNEY United States Patent Office 3,493,934
Patented Feb. 3, 1970

3,493,934
TONE DECODER HAVING PLURAL REFERENCE TONES
Walter K. French, Montrose, N.Y., assignor to International Business Machines Corporation, Armonk, N.Y., a corporation of New York
Filed Jan. 6, 1967, Ser. No. 607,794
Int. Cl. H04q 9/12
U.S. Cl. 340—171                 8 Claims

ABSTRACT OF THE DISCLOSURE

The invention relates to a circuit for determining the particular frequency of an unknown input signal, which signal may have only a limited number of values represented by differences in frequency. Where the input may have three possible difference frequency values, two reference voltages are provided, one of a frequency midway between the first and second of the possible values, and the other reference frequency midway between the second and third possibilities of input signals. Reference voltages are each applied to one input of a corresponding mixer along with the unknown input signal as the other input to each of the mixers. The two outputs from the mixers are applied through low pass filters to a logic circuit comprising several AND devices. Depending on the value of the input, one or the other of the low pass filters, or both, will generate an output signal and the logic circuit components combines these outputs to indicate the particular value to identify the unknown input signal.

---

Heretofore in the prior art in the detection of frequency differentiated code signals, it has been the practice to provide filters individual and equal in number to the various tones to be decoded. Such tone filters in the higher frequency ranges are not only expensive but also rather slow acting. One advantage that we have in the present case is that the simple low pass filters that are used are similar in construction and fewer in number than the number signals to be decoded and furthermore they are of a nature more rapidly responsive to receiving and conducting signals.

From the foregoing it is apparent that this invention relates generally to signal frequency distinction detecting means and more particularly to a rapid and economical form of discriminator using intermediate reference tones to mix with and distinguish one of a predetermined number of signal tones of predetermined frequency and thereby generate outputs which are proportional to the difference between the signal input and each of the plurality of reference signals. Means is also provided for converting each of the difference signals into a binary value whereby logic means may utilize said binary values to determine and use selectively the particular one of the several unknown input frequencies.

Another object of the invention is to provide means for detecting and decoding an unknown tone indirectly by the use of a plurality of intermediate frequency reference signals to be mixed with the input signal to generate a plurality of frequency beats in ranges proximate and remote from a center frequency.

Another object of the invention is to provide means for converting signal frequency differences into binary values for interpretation by a logic circuit. The devices provide a high-low, center discriminating device.

Another object of the invention is to provide means to measure frequency of one of several signal tones by the use of a fewer number of filters than the number of tones to be detected and decoded. Since a common form of low pass filter is used, more economical and faster types of apparatus are realized than heretofore.

The foregoing and other objects, features and advantages of the invention will be apparent from the following more particular description of a preferred embodiment of the invention as illustrated in the accompanying drawing.

In the drawing:

A single figure illustrates by block diagram the parallel circuits representative of an example of devices used with three possible tones to be received as signals and decoded in a binary logic fashion for utilization.

Referring to the illustration of the tone decoder it is seen at the left of the drawing that it is proposed that one of three signals tone $T_1$, $T_2$, or $T_3$ is to be entered as an input signal at the terminal 20 of the circuit. Along with such an entry there are also two other reference tones, the one at the upper terminal 21 being designated SIN $a_1t$ which has a reference tone frequency of 733 Hz. It will be noted that this frequency 733 is midway between the two possibilities of signal tones of 697 Hz. of signal $T_1$ and 770 Hz. of the second or central tone $T_2$.

A second reference tone is entered along with those at 20 and 21, it being entered at 22 and designated as SIN $a_2t$ where the reference tone has a value in frequency of 811 Hz. This 811 will be noted is midway between the central signal tone $T_2$ and the higher frequency tone $T_3$ which has the value 852 Hz.

With any one of the signals $T_1$, $T_2$, or $T_3$ entered at 20 along with both reference tones at 21 and 22 it is the purpose of the circuit to provide a single output 1T, 2T, or 3T at the right for control of the utilization device 34.

Assuming that the examples of frequencies are established by valves as shown on the drawing and that a signal F(t) is entered of 765 Hz. (a variation from the true tone 770 by an error caused by poor tuning) then this signal is passed along with the two different tones 733 Hz. and 811 Hz. to the respective mixers 23 and 24. The mixer stages 23 and 24 are provided merely for producing beat signals and therefore may be adders. Beyond the two mixers are the respective low pass filters 25 and 26. It may be assumed that in this example the low pass filters have their three DB points at about 55 Hz.

From the foregoing assumptions and with the frequency values as noted, then the upper low pass filter 25 will receive a beat of 34 Hz. and the lower one 26, a beat of 46 Hz. Since both of these signals are within the range of the filter, the signals are passed to the respective detectors 27 and 28 and out beyond them as binary signals to the logic AND devices 31, 32, and 33. In the instance noted, since both detectors provide a "1" signal, the central AND device 32 is the one made effective because both of the others are negated by the inverters 29 and 30 and the signal at 2T is the only signal entered into the utilization device 34. Of course, utilization may be made more direct and taken straight from the detectors 27 and 28 as binary variations 0, 0—0, 1—1, 0 or 1, 1.

Taking another example to illustrate the workings of the device, it may be assumed that a signal approximates the $T_1$ signal and the frequency of tone signal entered at F(t) and terminal 20 may be assumed to be 700 Hz. Then the top low pass filter would pass a beat of 31 Hz. and the lower low pass filter 26 would block because of the high range of the 111 Hz. beat derived from the difference between the 700 input and and 811 reference tone at terminal 22. Since the top detector 27 is the only binary agent effective with this last example, then the top AND device 31 is the only one effective and the output signal 1T is the only product of the logic devices and the only one effective to exercise control over the utilization device 34.

Although a rather simple example involving only three signal tones has been shown, it is obvious that the plurality of tones may be multiplied and still the number of mixer and other parallel devices will be fewer in number than the predetermined number of signal tones to be decoded. This effects a saving there, as well as the saving effected by the use of a common form of low pass filter such as those illustrated as 25 and 26. The response of such filters is faster than a tuned form of filter used heretofore besides being more economical.

What is claimed is:

1. A decoder device for identifying an input signal, which input signal may assume only a predetermined number of frequency distinguishing values comprising:
   means for applying reference signals to said device, each of said reference signals being of a frequency proportionately related to two of the possible frequency values which said input may assume, and
   means for comparing an unknown input with each of said reference signals and for generating outputs which are proportional to the difference between the unknown input and each of said reference signals.

2. A device of the kind set forth in claim 1 wherein each of said reference signals are of a frequency midway between two possible signal frequencies.

3. A device of the kind set forth in claim 1 with means for cooperating with said output generating means for converting each of said difference outputs into a binary value.

4. A device of the kind set forth in claim 3 with means for utilizing said difference outputs to determine the identity of said unknown input.

5. A device of the kind set forth in claim 4 wherein said utilizing means includes logic AND and INVERT devices operated by said binary difference outputs.

6. A decoder device for determining the frequency of an input signal, which input signal may assume only a predetermined number of values comprising:
   means for applying reference signals to said device, each of said reference signals being of a frequency mid-way between two of the possible frequency values which said input may assume,
   means for comparing an unknown input with each of said reference signals and for generating outputs which are proportional to the difference between the unknown input and each of said reference signals,
   means for converting each of said difference signals into a binary value, and
   logic means for utilizing said binary values to determine the frequency of said unknown input.

7. In a signal decoder circuit device comprising:
   a terminal for receiving one of a plurality of different signal tones of intervaled frequencies,
   a plurality of terminals for receiving a plurality of intermediate reference tones of different frequencies between said intervals of signal frequencies,
   mixers, one for each reference tone, for receiving a certain signal tone plus its particular reference tone,
   filters, one for each reference tone and mixer, for passing beat frequencies from a respective mixer when said beat frequency is due to a signal tone proximate the interval within which the reference tone operates,
   detectors, one for each reference tone, for producing signals representative of blocked or passed signals from the filters, and
   devices operated under control of said representative signals for emitting a selected one of a series of possible outputs.

8. In a signal decoder circuit device comprising:
   a terminal for receiving one of a plurality of different signal tones of evenly intervaled frequencies,
   a plurality of terminals for receiving a plurality of intermediate reference tones of different frequencies midway said intervals of signal frequencies,
   mixers, one for each reference tone, for receiving a certain signal tone plus its particular reference tone,
   filters, one for each reference tone and mixer, for passing beat frequencies from a respective mixer when said beat frequency is due to a signal tone proximate the interval within which the reference tone operates,
   detectors, one for each reference tone, for producing binary signals representative of blocked or passed signals from the filters,
   logic AND devices operated under control of said binary detectors for emitting a selected one of a series of possible outputs, and
   a utilization device operated by the selected output.

References Cited

UNITED STATES PATENTS 3,341,815   9/1967   Axe _____ 340—171

HAROLD I. PITTS, Primary Examiner

U.S. Cl. X.R.

340—147, 149, 311; 328—141